May 26, 1959     G. BARSKY ET AL     2,888,366
METHOD OF MAKING PLASTISOL GASKETS
Filed Oct. 9, 1951
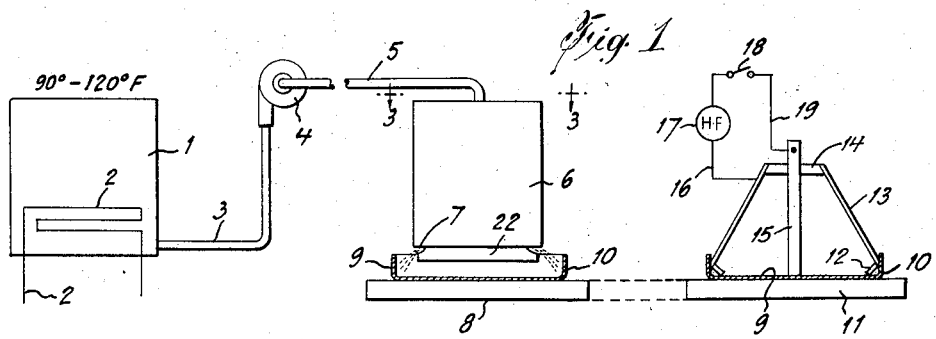
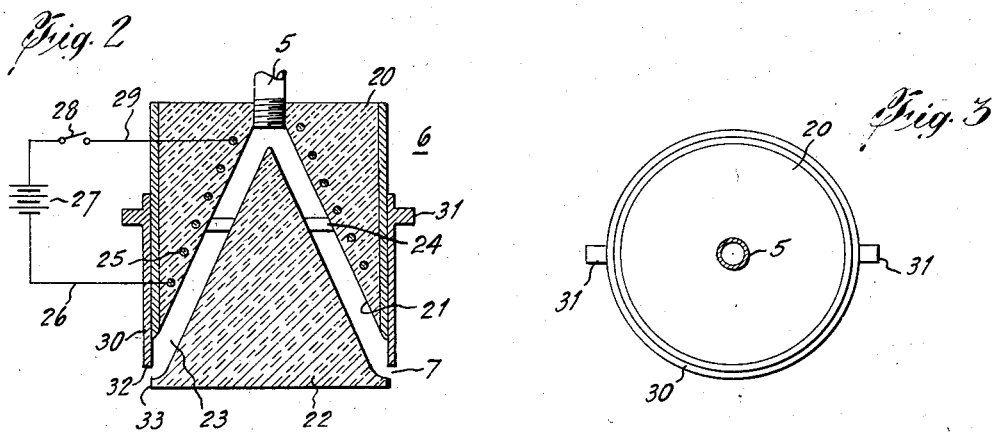
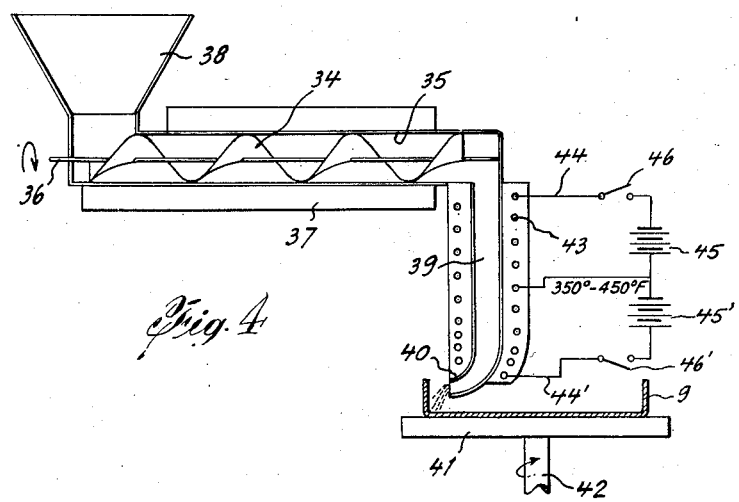
INVENTORS.
GEORGE BARSKY &
HARRY C. BIERMAN
BY
H. C. Bierman
ATTORNEY United States Patent Office 2,888,366
Patented May 26, 1959

2,888,366
METHOD OF MAKING PLASTISOL GASKETS

George Barsky, New York, and Harry C. Bierman, New Rochelle, N.Y.

Application October 9, 1951, Serial No. 250,524

5 Claims. (Cl. 117—93)

The present invention is directed to synthetic plastic materials, more particularly to a method and an apparatus for forming gaskets or the like on metal members.

It has become common practice to provide gaskets for can covers or the like by first making a mixture of a synthetic plastic material, a plasticizer and a pigment, heating said mixture to cause it to flow freely and then forcing it through a nozzle on to a metal cap or the like to form a gasket. Then the cap so treated was placed in an oven and heated to a relatively high temperature to cause gellation of the composition. This was disadvantageous in that it required a considerable amount of heat at a relatively high cost and a substantial length of time was consumed in the procedure, thus interfering with quantity production. The temperature was so high that it softened the lithographed surface of the cover so that it became scratched and otherwise injured during the operation. Then a special cooling operation was necessary, requiring additional equipment and additional power. It required a cooling operation so that the caps could be handled for packing and shipment.

The present invention is intended and adapted to overcome the difficulties and disadvantages inherent in prior methods, it being among the objects of the present invention to provide a method of producing and gelling gaskets which is simple and extremely rapid.

It is also among the objects of the present invention to provide a method of producing gaskets on metal articles which includes a heating step but wherein injury to lithographed surfaces is eliminated.

It is further among the objects of the present invention to provide a method which is highly effective, is adapted to be used in quantity production and is capable of automatic operation on a large scale.

It is still further among the objects of the present invention to provide an apparatus for carrying out the method which is simple in construction, may be substantially automatic in operation and has relatively few moving parts.

In practicing the present invention there is provided a plastisol which is a heterogeneous mixture of various substances, for example, a polyvinyl chloride resin, dioctyl phthalate and a filler in suitable proportions. This mixture is heterogeneous and it is maintained in the fluid state with some heating if necessary. The mixture is forced on to a metal member such as the inside of a cup or a drum around the inner edges thereof to form a gasket. The material thus laid down is immediately subjected to rapid heating to a temperature at which the mixture becomes gelled while preventing the bulk of the metal from becoming heated to the high temperature.

The heating may be accomplished by placing high frequency electrodes in proximity to the gasket material and passing high frequency, high voltage through the electrodes to provide dielectric heating of the gasket material. The time required for this operation is usually a few seconds and is never more than one minute. Thereby the heat is concentrated in the gasket material, causing a blending of the constituents and resulting in gellation. So little time is necessary that the metal becomes only partly heated and may be handled immediately after the operation is completed. Because of the relatively low temperature in the metal, no injury to the composition of the lithographing results.

The heating and the laying down of the gasket material may take place simultaneously. For instance, the plastisol mixture may be fed under pressure to a nozzle which is heated to a gellation temperature. The temperature in the nozzle may be graduated from a relatively low temperature at the in-take end thereof to a relatively high temperature at the outlet thereof. As the material passes through the nozzle, the constituents begin to blend and at the tip of the nozzle the material practically fully blended is laid down on the metal cap forming the gasket. Gellation takes place almost immediately. In this case also only a few seconds are necessary for the laying down and finishing of a gasket.

In the accompanying drawing constituting a part hereof and in which like reference characters indicate like parts, Fig. 1 is a diagrammatic view of an apparatus adapted to carry out the method of the present invention;

Fig. 2 is a vertical cross-sectional view taken through the feeder of Fig. 1;

Fig. 3 is a horizontal cross-sectional view of the feeder taken along line 3—3 of Fig. 1, and Fig. 4 is a diagrammatic view, some parts being shown in section and illustrating a modified form of the invention.

With reference to Figs. 1, 2 and 3, there is provided a tank 1 having a heating coil 2 therein and containing the plastisol mixture. The temperature therein is usually maintained at 90° to 120° F. The fluid mixture passes out through pipe 3 and is forced by pump 4 through pipe 5 and into the top of feeder 6.

A ring-shaped exit 7 at the lower end of the feeder allows the plastisol to be forced out in the form of a ring. On table 8 beneath feeder 6 is a can cover 9 or drum cap in position so that a ring 10 of plastisol is formed around the inner edge thereof.

After this operation is complete, table 8 may be slightly lowered or feeder 6 slightly raised and cover 9 shifted on to table 11. A ring-shaped electrode 12 having braces 13 and secured to insulating disk 14 fits over the gasket material 10. A second electrode 15 makes contact at its lower end with the metal of cover 9. The electrodes are connected into a circuit including wire 16 attached to brace 13 and connected to high frequency current 17. A wire 19 therefrom is connected to electrode 15 and a switch 18 allows the circuit to be made and broken.

Feeder 6 consists of a shell having an insulating filling 20 therein and being cone-shaped, as shown at 21. A similarly shaped plug 22 is inserted in cone 21, leaving a space 23 for plastisol mixture. Cone 22 is secured in position by arms 24 which may be three or four in number. Preferably a resistor 25 is placed in insulation 20 and is connected by wire 26 to a source of power 27 and to a wire 29 through switch 28.

Around the shell of the feeder is a slide or sleeve 30 having a pair of ears 31 to which is connected suitable mechanism for controlling the upward and downward movements of said sleeve. The lower edge 32 thereof is adapted to make close contact with edge 33 of cone 22 and thus in its downward movement to accurately and sharply cut off a ring of plastisol.

In the operation of the method a cover 9 is placed on table 8, material from tank 1 is forced by pump 4 into feeder 6 and towards opening 7. At this stage sleeve 30 is in its lowest position and blocks said opening. The sleeve is then raised to a sufficient distance and for a sufficient time to allow the correct amount of material to flow out of opening 7, whereupon the sleeve is moved downwardly to cut off the flow. Cover 9 is then shifted to table 11. Electrodes 12 and 15 are lowered into position, switch 18 is closed for a few seconds and the discharge into the plastic material causes gellation thereof. The electrodes are then raised and the cover removed.

Referring to the modification shown in Fig. 4, there is provided a screw conveyor 34 operating in a closed tube 35 with means attached to shaft 36 for rotating the screw conveyor. Heat and electrical insulation 37 surrounds tube 35 and if desired heating coils may be held therein. Material to be treated is placed in hopper 38 and is fed by screw conveyor 34 under suitable pressure.

At the other end of tube 35 is downwardly extending duct 39 terminating in nozzle 40. A rotating plate 41 has a vertical shaft 42 to which is attached means for rotating plate 41. Surrounding duct 39 and nozzle 40 is a heating coil 43. The upper half of the portion of said heating coil is connected to a source 45 of electricity with switch 46 for controlling the circuit. The lower portion of the heating coil is connected to a source of electricity 45′ with a switch 46′ for controlling the circuit.

In the operation of the device, a mixture of the constituents including the plastisol, plasticizer, pigment and the like is placed in hopper 38 and the rotation of screw 34 forms a uniform mixture of the constituents while at the same time compressing the same and feeding it forward. A preheat up to about 90° to 120° F. may be imparted to the mixture as it passes through pipe 35. As the mixture passes through duct 39 it is heated still further through the circuit 44—46 and then in the lower part of said duct and in nozzle 40 it is heated by circuit 44′—45′ to the maximum temperature, usually 350° to 450° F., which is a temperature of gellation. A can cover or the like 9 on rotating table 41 receives material issuing from nozzle 40 which is deposited in a ring within the corner of the cover. Due to the fact that the mixture is at the gellation temperature, the ring so laid down gells almost immediately without unduly increasing the temperature of the metal of cover 9.

Although the invention has been described setting forth two specific embodiments thereof, said examples were intended to illustrate the invention and not to limit it as various changes in the details may be made within the principles herein set forth. For instance, table 11 and plate 41 may be cooled so as to keep the temperature of cover 9 down to a relatively low point at all times. In the modification shown in Fig. 1, instead of shifting cover 9 from table 8 to table 11, said tables may be made movable in order to vary the procedure. Instead of the type of feeder shown in Fig. 1, the nozzle 40 and rotating table 41 may be substituted for the same. Feeder 6 may be heated in addition to the heating taking place in tank 1 or in place thereof. The inner portion of cone 22 may be heated by electrical or other means and in such case the leads or other connection for said cone may enter through braces 24. Such heating may be electrical, steam, gas, hot liquid or the like.

Instead of a sliding movement of sleeve 30 the inner face thereof and the outer face of feeder 6 may be correspondingly threaded whereby rotation of sleeve 30 will cause vertical movement thereof to cut off the material flowing out of space 7. The uppermost position of sleeve 30 may be adjusted so as to vary the maximum opening of space 7 and thus control the amount of material deposited at each operation. In a similar manner the size of the opening of nozzle 40 may be varied or the nozzle may be made removable and nozzles of various sizes substituted therefor.

In the modification of Fig. 1 the electrodes may be attached to and combined with feeder 6 and the deposition of the material and heating thereof to gellation may take place in a single position on table 8 by successive operations within a few seconds of each other. Usually the time of heating by induction is less than one minute and it has been found satisfactory to have a time of heating of five to ten seconds, and this is considered to be rapid heating.

Various types of mixtures may be used in accordance with the present invention and various forms of covers or similar elements may have gaskets of various sizes and shapes deposited thereon or therein. For example, a cap or other element may have an outer flange and the deposit may be along the outer corner of such an element.

Instead of having electrodes as shown at the right of Fig. 1, electrode 15 may be replaced by one or more edge electrodes which contact with the upper rim of the cover and thus insure good electrical contact during the heating. Instead of heating the covers while in a stationary position on table 11, there may be provided a horizontal moving belt on which successive covers are placed and are preferably clamped to the belt by means contacting the upper rim of the covers. Such a belt constitutes one of the electrodes and the second electrode may be spaced horizontally a short distance above said belt and said covers, whereby the covers are heated as they pass under the upper electrode, thus increasing the rate of production.

These and other changes in the details of construction may be made without departing from the principles herein set forth, and the invention is to be broadly construed and to be limited only by the character of the claims appended hereto.

We claim:

1. A method of forming plastisol gaskets on metal members which comprises providing a heterogeneous mixture of a resin and plasticizer, maintaining said mixture in fluid state, depositing said mixture onto said metal member, connecting said member to a source of high frequency and high voltage, said member being one of a pair of electrodes, placing the other of said electrodes in proximity to said deposited mixture, and activating said electrodes to heat and gel said mixture without correspondingly heating said metal member.

2. A method of forming plastisol gaskets on metal members which comprises providing a heterogeneous mixture of a resin and plasticizer, maintaining said mixture in fluid state, depositing said mixture onto said metal member, connecting said member to a source of high frequency and high voltage, said member being one of a pair of electrodes, placing the other of said electrodes in proximity to said deposited mixture, and activating said electrodes to heat and gel said mixture to about 350°–450° F. without correspondingly heating said metal member.

3. A method of forming plastisol gaskets on metal members which comprises providing a heterogeneous mixture of a resin and plasticizer, maintaining said mixture in fluid state, flowing said mixture through a ring-shaped opening and depositing said mixture onto said metal member, connecting said member to a source of high frequency and high voltage, said member being one of a pair of electrodes, placing the other of said electrodes in proximity to said deposited mixture, and activating said electrodes to heat and gel said mixture without correspondingly heating said metal member.

4. A method of forming plastisol gaskets on metal members which comprises providing a heterogeneous mixture of a resin and plasticizer, maintaining said mixture in fluid state, flowing said mixture through a ring-shaped opening and cutting off said flow by closing said opening to form an annular gasket, then depositing said mixture onto said metal member, connecting said member to a source of high frequency and high voltage, said member being one of a pair of electrodes, placing the other of said electrodes in proximity to said deposited mixture, and activating said electrodes to heat and gel said mixture without correspondingly heating said metal member.

5. A method of forming plastisol gaskets on metal members which comprises providing a heterogeneous mixture of a resin and plasticizer, maintaining said mixture in fluid state by preheating the same to a temperature below which gellation thereof takes place, depositing said mixture onto said metal member, connecting said member to a source of high frequency and high voltage, said member being one of a pair of electrodes, placing the other of said electrodes in proximity to said deposited mixture, and activating said electrodes to heat and gel said mixture without correspondingly heating said metal member.

References Cited in the file of this patent

UNITED STATES PATENTS

| | | |
|---|---|---|
| 945,357 | Wilzin | Jan. 4, 1910 |
| 1,447,816 | Peelle | Mar. 6, 1923 |
| 1,486,937 | Taliaferro | Mar. 18, 1924 |
| 1,861,589 | Warth | June 7, 1932 |
| 2,442,179 | Shanklin | May 25, 1948 |
| 2,489,407 | Foye | Nov. 29, 1949 |
| 2,516,908 | Pottle | Aug. 1, 1950 |
| 2,553,590 | Joswig | May 22, 1951 |
| 2,608,177 | Powers | Aug. 26, 1952 |
| 2,610,131 | Shanklin | Sept. 9, 1952 |